United States Patent [19]

Kaliski

[11] 3,714,604

[45] Jan. 30, 1973

[54] SELF-EXCITED ELECTRON-PHONON RESONATOR

[76] Inventor: Sylwester Kaliski, ul Einsteina 17, Warszawa, Poland

[22] Filed: July 13, 1970

[21] Appl. No.: 54,498

Related U.S. Application Data

[63] Continuation-in-part of Ser. No. 788,504, June 2, 1969, abandoned.

[52] U.S. Cl. ..................331/107 A, 310/8.1, 310/8.2, 310/9.8, 330/5.5, 307/88 R, 333/72

[51] Int. Cl. ..............................................H01v 7/00

[58] Field of Search ..................330/4.3, 5.5; 333/30; 331/107 A; 310/8.1, 8.2, 9.8

[56] References Cited

UNITED STATES PATENTS 3,411,023 11/1968 Quate ..................................330/5 X
3,377,588 4/1968 Picquendar..........................330/5 X
3,422,371 1/1969 Poirier................................330/5 X

*Primary Examiner*—Roy Lake
*Assistant Examiner*—Darwin R. Hostetter
*Attorney*—Irvin A. Lavine

[57] ABSTRACT

A method of obtaining an unlimited, in linear range, resonance of a piezoelectric surface wave by providing a piezoelectric semiconductor crystal having surfaces fulfilling Sommerfield boundary condition requirements, irradiating said crystal to establish therein a thin, near surface semiconducting layer to thereby generate surface waves in said layer, and amplifying said waves by applying a high voltage direct current to said layer; in addition, high frequency signals may be applied to said layer.

5 Claims, 1 Drawing Figure

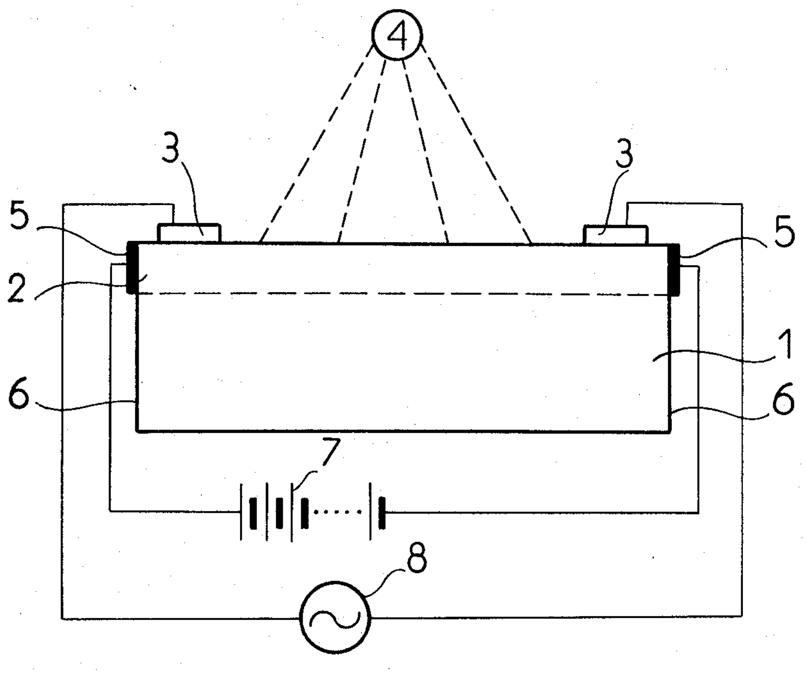
4
3
3
5
5
2
1
6
6
7
8

SELF-EXCITED ELECTRON-PHONON RESONATOR

This application is a continuation-in-part application of application Ser. No. 788,504, filed June 2, 1969 and now abandoned.

This invention relates to the method of obtaining an unlimited, in linear range, resonance of piezoelectric surface waves, particularly ultrasonic waves, and of spontaneous oscillations in a piezoelectric semiconductor crystal, in particular, of cadmium sulphide or cadmium selenide.

The resonance, unlimited in linear range, will be referred to as an ideal resonance. Ideal resonance, also referred to herein as resonance unlimited in linear range, is resonance in a theoretical system in which there is no damping due to the material. With the present invention, the actual resonance is only negligibly less than the theoretical resonance, and so is practically in a linear range or alternatively is said to be substantially unlimited.

There is disclosed in Ouste et al. U.S. Pat. No. 3,411,023 piezoelectric semiconductor crystals, in which a crystal plate with a wave length or frequency depending on the plate size, i.e., on the frequency of self-oscillations of the crystal, is excited to resonance in a known way, whereafter, a voltage for generating therein an electron drift is applied to the plate. Because of this, at a critical drift velocity, an ideal resonance amplification is obtained, and in absence of excitation of the plate generates spontaneous oscillations. For controlling the specific resistance of the plate, the latter is irradiated by a sodium lamp. This method, however, has a drawback in that it is limited to longitudinal and transverse waves only. Further, the system operating with longitudinal and transverse waves, due to a necessity for refrigeration, can only work in the case of plates which are very thin in the direction of wave propagation.

The purpose of the present invention is to obtain an ideal (substantially) resonance of piezoelectric surface waves, specifically ultrasonic waves and spontaneous oscillations in a piezoelectric semiconductor crystal plate of any dimensions in the sense of the wave propagation.

This object could have been realized by making use of the effect of continuous amplification of the surface wave in a piezoelectric semiconductor crystal plate in which, due to irradiation, a thin near surface semi-conducting layer is generated, in which layer an electron drift is localized, and, further, owing to the fact that a complete reflection of the surface wave from the plate edge has been obtained, due to realization of boundary conditions of the Sommerfield type for two opposite plate surfaces, being rectangular to the irradiated surface.

The essence of the invention consists in that the surface of the piezoelectric semiconductor crystal plate is excited to oscillations in a known way, for instance, by means of acoustic transducers, the plate is irradiated by visible light or by light of a chosen wave length, due to which a near surface semi-conducting layer is generated in the plate. The acoustic transducer may be a comblike structure applied to the crystal surface.

To this surface a direct current of high voltage is applied, which generates therein an electron drift, and, in consequence, at a critical drift velocity, a de-damping of the oscillating crystal and a substantially ideal amplification of these oscillations takes place.

Thereby, the resonance frequency can be controlled in a continuous way.

At the same time, in absence of an excitation, upon application of only a direct voltage generating a drift field, a generation of spontaneous oscillations takes place.

The fulfillment of Sommerfield's boundary conditions in the case of propagation of a longitudinal surface wave exists when normal stresses and tangential displacements of the crystal on its boundary surface are equal to zero, or the tangential stresses and normal displacements of the crystal on its boundary surface are simultaneously equal to zero. In case of propagation of a transverse surface wave, however, these conditions are fulfilled automatically on the free surface. The length of the crystal is dependant upon the purpose to which the resonator is to be applied and the frequency, and equals from fractions of a millimeter to several millimeters. The crystal width is chosen most advantageously as equal to the magnitude of several to a dozen or so wave lengths. The purpose of this is to eliminate the possibility of boundary disturbances from the side surface of the crystal. The crystal thickness must exceed the wave length. Such a thickness ensures a non-distorted deformed, by itself, propagation of surface wave since the surface wave decays or fades at a depth of the order of a wave length. The surface waves are the waves whose amplitude decreases expotentially with the surface depth. The theory of generating the surface waves, also called the Rayleigh waves, is presented by J. W. Rayleigh in his paper titled"On waves propagated along the plane surfaces on elastic solid", Proc. London Math. Soc. 1885, 17 p. 4–11.

The present invention will be understood with reference to the attached drawing, the single FIGURE showing schematically a crystal and ancillary apparatus and circuitry for performing the method.

A piezoelectric semiconductor crystal plate 1 is irradiated by light from the source 4. In the case of a cadmium selenide crystal by visible light, while in the case of a cadmium sulphide crystal by light of a wave length of the order of 520 nanometers.

Under the influence of the irradiation, due to the photo-electric effect and poor light transmittivity of up to a dozen or so microns into the crystal, in the plate 1 a thin near surface semiconducting layer 2 is formed, while the remaining portion of the plate behaves as a piezoelectric body. This thin layer is near the irradiated surface of the crystal, because of the poor transmission of the selected light into the crystal.

Thereafter, the plate 1 is excited to resonance, for instance, from a high-frequency generator 8 with oscillations generating an ultrasonic surface wave. These oscillations are applied to the plate through contact finger structures 3 applied to the surface of the plate 1, in spaced relation.

At the same time from source 7 through indium contacts 5 to layer 2 high voltage direct current is applied, which generates in this layer an electron drift.

At a critical drift velocity a de-damping of the oscillating crystal occurs and an ideal resonance amplification of the surface wave, practically in a linear range, takes place.

To avoid reflection of the surface wave from the edge, the surfaces 6 of plate 1 fulfill the Sommerfield boundary conditions at a depth of wave fading and decay.

In case of an absence of excitation from the generator 8 and the application to layer 2 of plate 1 of high voltage generating an electron drift only, the plate 1 generates spontaneous oscillations which are received through contacts 5. The frequency of these oscillations and the resonance frequency are different within the limits from a dozen or so to many hundred megacycles per second. The oscillations amplified by resonance can be transmitted electrically or acoustically also, the reception may be electrical or directly acoustical.

The generation of spontaneous oscillations is acoustical; the signal can be received electrically or acoustically.

The method according to the invention permits a continuous control of resonance frequency of the crystal without changing its dimensions, at some minor modification of frequency of the order of a few per cents.

Since the effect of electron drift occurs only in the subsurface layer generated by means of the photo-electric effect, the refrigeration of the crystal is natural, i.e., using only ambient atmosphere, and the application of an additional refrigeration, i.e., artificial cooling, improves only to a small degree the resonance effect.

The generated spontaneous oscillations achieve a high stability of the frequency.

I claim:

1. The method of obtaining a substantially unlimited, in linear range, resonance of a piezoelectric surface wave in a piezoelectric semiconductor crystal, comprising:

a. providing a piezoelectric semiconductor crystal having surfaces which fulfill the requirements of the Sommerfield boundary conditions, b. establishing in said crystal a near surface semiconducting layer by irradiating a surface of said crystal, c. generating ultrasonic surface waves in said crystal in a surface adjacent said semi-conducting layer, d. and amplifying said surface waves in said layer by applying a high voltage direct current to said irradiated crystal surface, e. whereby to effect de-damping of the surface waves and resonance amplification thereof in a substantially unlimited linear range.

2. The method of claim 1, said crystal being cadmium sulphide and said irradiation being by light of a wave length in the order of 520 nanometers.

3. The method of claim 1, said crystal being cadmium selenide and said irradiation being by visible light.

4. The method of claim 1, said surface waves being generated by the application of signals thereto from a high frequency generator.

5. The method of claim 1, wherein said layer has a thickness between several and about a dozen micrometers.

* * * * *